J. G. PUGSLEY.

Car Spring.

No. 2,340. Reissued Aug. 21, 1866.

A

WITNESSES
C. C. Johnson
Wm. J. Dunlap

INVENTOR
John G. Pugsley

N. PETERS. Photo-Lithographer. Washington, D. C.

UNITED STATES PATENT OFFICE.

JOHN G. PUGSLEY, NEW YORK, N. Y.

IMPROVED CAR-SPRING.

Specification forming part of Letters Patent No. 39,422, dated August 4, 1863; Reissue No. 2,340, dated August 21, 1866.

*To all whom it may concern:*

Be it known that I, JOHN G. PUGSLEY, of the city, county, and State of New York, have invented a new and useful Improvement in Car-Springs; and I do hereby declare that the following is a full and exact description thereof, reference being had to the accompanying drawings, making a part of this specification, and to the letters of reference marked thereon.

Figure 1:
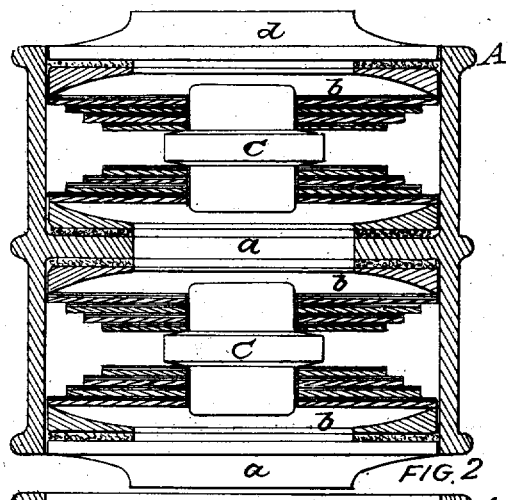
Figure 4:
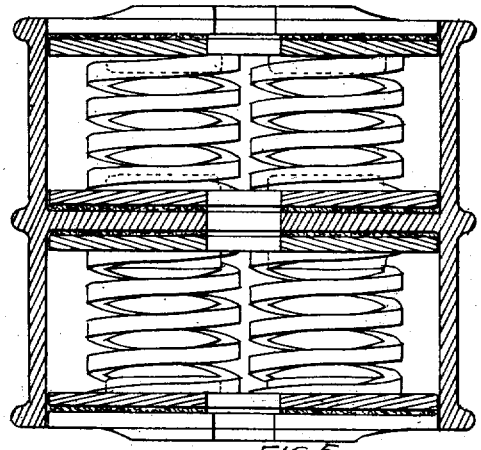
Figure 2:
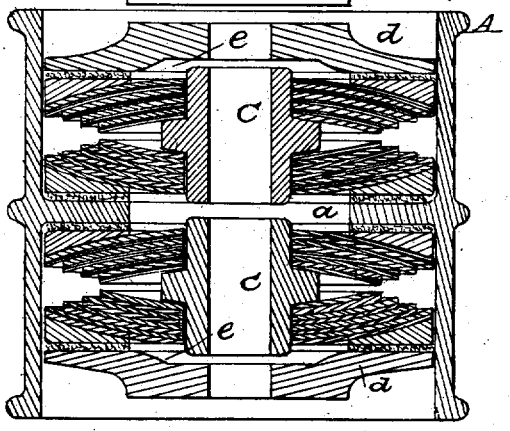
Figure 5:
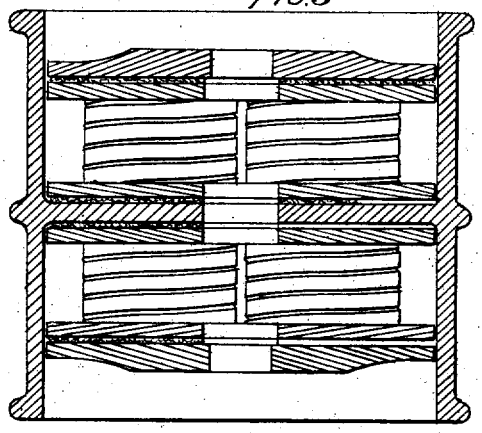
Figure 3:
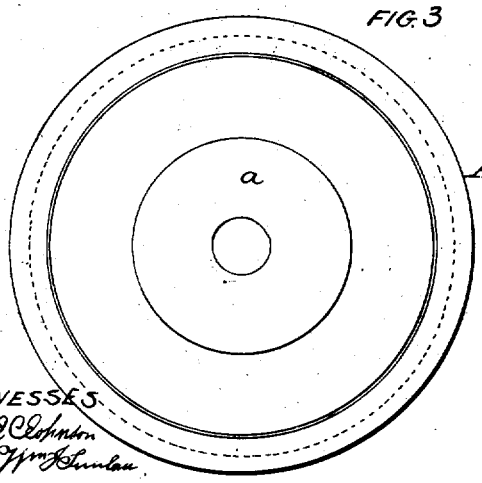
Figure 6:
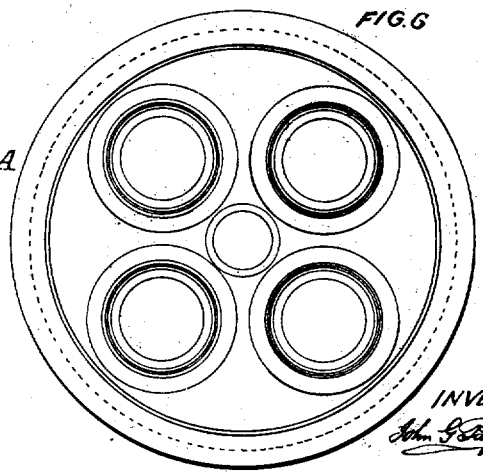

Figure 1 is a vertical section of the spring not under pressure. Fig. 2 is a vertical section of the same under pressure. Fig. 3 is a plan or top view of the same. Fig. 4 is a vertical section of my invention when used with spiral springs not under pressure. Fig. 5 is a vertical section of the same under pressure. Fig. 6 is a plan of the same with the top plate removed.

The nature of my said invention consists, first, in a case receiving springs on each side of a central partition or diaphragm, and toward which said springs yield when under pressure, said case retaining the springs in their proper positions and excluding dirt and extraneous substances; second, in a series of perforated disks or gradually-decreasing annular plates, in combination with a central and flanged distributer, and with a pair of concave rings, against which the edges of the largest annular plate rests, so that the pressure will cause the annular plates to bend into a concave form and the concave rings and the flanged distributer will prevent the disks being bent beyond a certain point, so that they will not be injured by too heavy loads.

I make the cylinder A, Fig. 1, of metal. The flange or diaphragm *a* projects inward at its center.

The rings *b b b b*, I make to fit freely into the cylinder. The flat side of each I make to fit on both sides of the central flange, *a*, and on the inside of the top and bottom plates, to be hereinafter described, respectively. The concave side of said rings I make of such a curve as will allow the springs to yield to the desired distance, and then sustain the spring by presenting a solid bearing, and thus prevent the springs from being broken by any great weight that may be placed upon them.

I make the distributers *c c* of cylindrical form, having a convex flange projecting outward from its center, the curve whereof is made so as to limit the yield of the springs. The thickness is such as to keep the springs the proper distance apart. A round hole is made through its center to admit of a rod or bolt.

I make the top and bottom plates, *d d*, to fit freely into the cylinder. The edge I make spherical, so as to move smoothly in the cylnder. In the center I make a round bolt-hole, similar to that described in the distributer *c*. The inside of the plates are made flat with the recess *e* to receive the end of the distributer.

The springs I make of annular disks of thin steel plate of graduated diameters, (see Fig. 1,) having a round hole in the center of each to fit on the cylindrical end of the distributers. These I place on the distributers, two or more of a size. Four pairs are shown in Figs. 1 and 2; but I do not wish to limit myself, as more or fewer may be used to meet any required contingency. I make packing-flange rings of rubber, felt, or other soft yielding substance for each thrust-ring in the spring. These I place between the rings *b* and the flange *a*, and between the rings *b* and the top and bottom plates, *d*, to reduce the effect of the short and sudden blows upon the spring.

The annular plates or disks having been placed upon the distributers, as shown in Figs. 1 and 2, I place a thrust-ring, *b*, upon the flange of the cylinder with a packing-ring intervening. I place a spring upon the thrust-ring, the largest disk resting upon the concave side thereof. Upon the spring I place another thrust-ring, *b*, with its concave side resting on the largest disk. A packing-ring, *d*, is placed upon the thrust-ring and the top plate is put thereon. The cylinder is then turned upside down and the packing-rings, springs, and bottom plate are put together as just described, and a bolt is passed through the whole to keep the parts in position.

When placed in position for use the bottom plate must rest upon a round piece of wood or metal, made small enough to allow the cylinder to descend over it to the distance allowed by the elasticity of the springs below the flange. A similar piece must be placed upon the top plate to allow it to descend into the cylinder to the extent of the range of the spring above the flange of the cylinder.

When a weight is made to rest upon the top plate the strain is transmitted to the steel disk of the first spring, and by it to the distributer and second spring, thence to the flange of the cylinder and to the third spring, and through the second distributer to the fourth spring, thence to the bottom plate. It will be readily seen that, the weight thus poised upon the disks of the four springs, the yield of each will be equal, each being alike sensitive to every change of burden until the limit of their resistance is reached and the springs are bent to fit the curves of the ring and distributers, when they attain a solid bearing, (softened only by the packing-rings,) which no reasonable addition of burden can fracture.

It will be observed that the cylinder will always retain a central position with regard to the height of the spring throughout all its various degrees of compression.

In most, if not all, of the compound plate-springs now in use the strain is not equally distributed among the springs composing the series. The result is that one of the series is frequently broken, which eventually destroys the whole.

It will now be understood that the peculiarity in the construction of the case consists in the employment of a central flange or diaphragm, *a*, with the springs placed on opposite sides thereof, so that the case is sustained by the springs and protects them from injury, and toward which the springs yield when compressed, and this case, with its central flange or diaphragm, may be employed with the disk-springs shown in Figs. 1, 2, and 3, or it may be used with helical springs introduced, as shown in Figs. 4, 5, and 6, the case and its action and objects being the same whether the one kind of spring or the other is employed.

I do not claim the disk-spring, as the same has been used before and is now in use.

What I claim, and desire to secure by Letters Patent, is—

1. The use or employment of a cylindrical spring-case having a central flange that sustains the springs on either side, and toward which they yield, as specified.

2. A series of perforated spring-disks or annular plates, in combination with a central and flanged distributer, and with concave rings or bearings, against which the spring-disks rest, substantially as and for the purposes specified.

In witness whereof I have hereunto set my signature this 28th day of June, A. D. 1866.

JOHN G. PUGSLEY.

Witnesses:
GEO. D. WALKER,
CHAS. H. SMITH.